United States Patent
Eggers et al.

(10) Patent No.: US 6,576,348 B2
(45) Date of Patent: Jun. 10, 2003

(54) MULTILAYER FILM WITH LAMINATION AND HEAT-SEALABLE SIDES, AND HAVING ANTIFOGGING PROPERTIES

(75) Inventors: Holger Eggers, Freiburg (DE); Rudi Klein, Walsrode (DE); Claudia Müller, Walsrode (DE); Rainer Brandt, Walsrode (DE)

(73) Assignee: Wolff Walsrode AG, Walsrode (DE)

(*) Notice: Subject to any disclaimer, the term of this patent is extended or adjusted under 35 U.S.C. 154(b) by 146 days.

(21) Appl. No.: 09/826,187

(22) Filed: Apr. 4, 2001

(65) Prior Publication Data

US 2002/0187342 A1 Dec. 12, 2002

(30) Foreign Application Priority Data

Apr. 12, 2000 (DE) .......................... 100 18 049

(51) Int. Cl.[7] .............................. B32B 27/32
(52) U.S. Cl. .................. 428/516; 428/35.4; 428/36.7; 428/520
(58) Field of Search .................. 428/35.4, 36.7, 428/516, 520

(56) References Cited

U.S. PATENT DOCUMENTS

| 4,547,433 A | 10/1985 | Ohya et al. ............... 428/516 |
| 4,726,984 A | 2/1988 | Shah ......................... 428/216 |
| 5,318,829 A | 6/1994 | Tada et al. ................ 428/213 |
| 5,766,772 A | 6/1998 | Ciocca et al. ............. 428/516 |

FOREIGN PATENT DOCUMENTS

| EP | 0 561 428 | 4/1998 | |
| WO | WO 95/18845 | 7/1995 | ............ C09K/3/18 |

OTHER PUBLICATIONS

Derwent Abstract (Accession# 127913) of JP 7052334A dated Feb. 28, 1995.
Derwent Abstract (Accession# 091659) of JP 4033850A dated Feb. 5, 1992.
Derwent Abstract (Accession# 98188E) of JP 57162731A dated Oct. 6, 1982.
Derwent Abstract (Accession# 40680E) of JP 57061036A dated Apr. 13, 1982.
Derwent Abstract (Accession# 088365) of JP 5031865A dated Feb. 9, 1993.

*Primary Examiner*—D. S. Nakarani
(74) *Attorney, Agent, or Firm*—Norris McLaughlin & Marcus

(57) ABSTRACT

A multilayer film having a lamination side and a heat-sealable side is described. The multilayer film comprises, a) an inner layer (i) ethylene/vinyl alcohol copolymer; b) a coupling agent layer (ii) and a separate coupling agent layer (ii'), said inner layer (i) being interposed between and in contact with each of said coupling agent layer (ii) and said separate coupling agent layer (ii'); c) at least one further layer (iii), said separate coupling agent layer (ii') being interposed between and in contact with each of said inner layer (i) and said layer (iii); d) at least one layer (iv), said coupling agent layer (ii) being interposed between and in contact with each of said inner layer (i) and said layer (iv); and e) a heat-sealable layer (v), said layer (iv) being interposed between and in contact with each of said coupling agent layer (ii) and said heat-sealable layer (v). Layers (i), (ii), (ii'), (iii) and (v) of the multilayer film contain 0.1 to 3 wt. % of a sorbitan monoester, based on the total weight of said multilayer film. Layer (iii) defines the lamination side of the multilayer film, and the heat-sealable layer (v) defines the heat-sealable side of the multilayer film. Packaging materials comprising the multilayer film are also described.

9 Claims, 1 Drawing Sheet

Diagram of the multilayer film

Diagram of the multilayer film

MULTILAYER FILM WITH LAMINATION AND HEAT-SEALABLE SIDES, AND HAVING ANTIFOGGING PROPERTIES

FIELD OF THE INVENTION

The present invention relates to a heat-sealable laminating film with lamination and heat-sealable sides, and having excellent antifogging properties at low temperatures. The film according to the present invention, in conjunction with a suitable supporting film, is suitable in particular for packaging moist, oxygen-sensitive products such as fresh meat for example, which are presented chilled to the purchaser. In such an instance, suitable packaging, using the laminating film according to the invention ensures optical package properties which are not disturbed by condensation on the inside. The present invention also relates to composites which include the heat-sealable laminating film according to the invention as one component together with use of the heat-sealable laminating film or the packaging materials containing said film for packaging foodstuffs.

BACKGROUND OF THE INVENTION

Fresh meat products are increasingly offered to the consumer in ready-to-use portions. In this way, better hygiene is ensured than is the case when the meat is cut into portions and packed by hand at a conventional meat counter in a supermarket, for instance. In addition, meat products which are previously cut into portions exhibit a longer shelf life than meat products cut to the customer's individual requirements, owing to the more sterile cutting conditions and secure packaging.

This market development brings with it particular requirements with regard to the films used for packaging such pre-portioned meat products. Thus, in most cases the packaging used is lidded packaging consisting of a rigid tray and a transparent lid. Both components have to have good oxygen barrier properties to protect the product from oxidative deterioration. In addition, the lid film has to exhibit good transparency, in order to allow the consumer to see the product on offer and to be able to present it as attractively as possible. As a result of chilled storage and the moisture-saturated atmosphere in the packaging, condensation typically arises on the inside of the transparent lid. This condensation is disturbing in that it leads to fogging of the lid film and thus an impaired view of the product. Since the deposition of moisture contained in the package on the surface of the packaging cannot in principle be prevented, lid films are required which allow condensation in the form of a continuous liquid film, which thus does not impair transparency.

Laminated lidding films with a stretched supporting film and a heat-sealable layer of polyethylene or ethylene copolymers have been widely used for a relatively long period.

The need for a stretched supporting film stems primarily from the improved machine processing characteristics of such composites, owing to the high rigidity thereof, in comparison with unstretched films. Biaxially oriented polypropylene (BOPP) or biaxially oriented polyethylene terephthalate (BOPET) are predominantly used as supporting films. The corresponding types do not have the oxygen barrier properties necessary for the above-described use without further finishing, such as for instance oxide vapor deposition.

Where the supporting film itself does not have adequate oxygen barrier properties, the heat-sealable layer generally comprises multilayer films of polyethylene and/or ethylene copolymers, which have one or more layer(s) of ethylene/vinyl alcohol copolymers (EVOH) as an oxygen barrier. These films are designated hereinafter as "heat-sealable barrier layer" or "heat-sealable barrier layer films." The structure of such heat-sealable barrier layer films is described, for example, in EP-A 560 495, EP-A 561 428, U.S. Pat. No. 4,726,984 and U.S. Pat. No. 4,547,433.

The low surface tension of polyethylene or ethylene copolymers on the heat-sealable side of the stated multilayer oxygen-blocking heat-sealable layers does not allow a substantial amount of wetting on contact with water but rather leads to the formation of water droplets on the surface. In a sufficiently finely dispersed form, which is achieved on the surface for instance during a condensation process, these droplets lead to marked haziness of the film. This phenomenon is conventionally known as fogging.

In this regard, the use of migrating additives in heat-sealable barrier layers is known to achieve wettability with water. Esters of polyhydric alcohols such as sorbitan or glycerol with saturated or unsaturated aliphatic carboxylic acids, generally containing between 8 and 40 carbon atoms, are generally used as the additive. Mono- and/or diesters are preferably used. Another class of additive conventionally used consists of polyoxyethylene compounds. Ethers of polyoxyethylene with higher aliphatic alcohols are typically used, for example, in this regard.

A product which is totally satisfactory for this application from the point of view of both concentration and composition of the additives and also the structure of the heat-sealable barrier layer has not yet been found. Indeed, the large number of patent applications in this field, such as for example EP-A 739 398, shows that a considerable need has yet to be met.

A particular requirement placed on heat-sealable barrier layers having antifog properties is the desire for the antifogging action to begin soon after the packaging process and to last for a sufficiently long time.

In addition, in order for the film to run in a problem-free manner through the packaging machine it must exhibit good surface slip properties in particular with regard to metal. This is typically not the case with films with antifog properties, since the migrating antifog agent is deposited on the surface and forms a layer thereon which is matt and tacky owing to its chemical composition.

In practice, heat-sealable barrier layers with antifog properties are frequently also observed to exhibit a slight delamination tendency. This effect is a consequence of the reaction during coextrusion of the acid groups contained in coupling agents with the non-esterified hydroxyl groups of the polyhydric alcohols of the antifog agents used. As a consequence, a further requirement is for the layers of the composite to be as difficult to separate as possible.

SUMMARY OF THE INVENTION

Thus, an object of the present invention is to provide a heat-sealable barrier layer having an antifog action beginning soon after packaging and lasting a sufficiently long time, good surface slip with regard to metal, and high mechanical integrity.

In accordance with the present invention, there is provided a multilayer film having a lamination side and a heat-sealable side comprising:

a) an inner layer (i) of comprising ethylene/vinyl alcohol copolymer;

b) a coupling agent layer (ii) and a separate coupling agent layer (ii'), said inner layer (i) being interposed between and in contact with each of said coupling agent layer (ii) and said separate coupling agent layer (ii');

c) at least one further layer (iii), said separate coupling agent layer (ii') being interposed between and in contact with each of said inner layer (i) and said layer (iii);

d) at least one layer (iv), said coupling agent layer (ii) being interposed between and in contact with each of said inner layer (i) and said layer (iv); and e) a heat-sealable layer (v), said layer (iv) being interposed between and in contact with each of said coupling agent layer (ii) and said heat-sealable layer (v);

wherein said multilayer film contains sorbitan monoester in an amount totaling from 0.1 to 3 wt. % based on the total weight of said multilayer film, said layer (iii) defining said lamination side of said multilayer film, and said heat-sealable layer (v) defining said heat-sealable side of said multilayer film. In an embodiment of the present invention, the multilayer film contains 0.3 to 1 wt. % of the sorbitan monoester, based on the total weight of the multilayer film.

Other than in the operating examples, or where otherwise indicated, all numbers expressing quantities of ingredients, reaction conditions, and so forth used in the specification and claims are to be understood as modified in all instances by the term "about."

Unless otherwise noted, the following conventions are applicable to the multilayer films described herein.

Where not otherwise stated, abbreviations for plastics in accordance with DIN 7728 or ISO 1043-1987 (E) are used in the description of the polymers contained in the individual layers.

In multilayer structures, the sequence of layers is stated by stringing together the polymer abbreviations for the corresponding layers or otherwise explained symbols, separated from each other by double oblique slashes. The heat-sealable layer side is always on the right. It is also possible to state only part of the total sequence of layers constituting the film. In these cases, the heat-sealable layer side is again always on the right and unstated layers or combinations of layers are indicated by three full stops (i.e., . . . ). Similar polymers may be distinguished from one another by numbering, for example as in PE-LD-1//PE-LD-2//PE-LD-3. Mixtures of different polymers are indicated by the symbol+and the combination of components between parenthesis, ( ). Details of percentage composition may optionally also be stated here. Unless otherwise stated, the fractions stated are always fractions by weight relative to the total weight of the mixture. The expression . . . //PA//E/VOH// . . . //(PE-LD-1+PE-LLD)//d, for example, thus describes a structure having an unspecified outer layer or outer sequence of layers, followed by a layer substantially consisting of polyamide, followed by a layer substantially consisting of ethylene/vinyl alcohol copolymer (E/VOH), followed by an unspecified layer or sequence of layers, followed by a layer comprising a mixture of low density polyethylene provided with the number 1 (PE-LD-1) and an ethylene/-olefin copolymer (PE-LLD), together with a following layer on the heat-sealable side to be specified in greater detail with d.

Layers which primarily provide a mechanical bond between the layers adjoining them on both sides are designated below as . . . //HV// . . . , wherein HV serves an abbreviation for coupling agent. Typical polymers used as coupling agents are described below.

Melting points are stated hereinafter with reference to the value determined in accordance with ASTM 3418 using DSC analysis (Differential Scanning Calorimetry Analysis).

Softening points are stated hereinafter with reference to the value determined in accordance with ISO 306.

Melt flow rates (MFR) are stated hereinafter with reference to the value determined in accordance with DIN ISO 1133. Unless stated otherwise, the measurement condition with regard to temperature and application weight is condition D of DIN ISO 1133, with a temperature of 190° C. and an application weight of 2.16 kg.

The density of the raw materials relates to the measuring method according to ISO 1183 (A).

DETAILED DESCRIPTION OF THE INVENTION

Figure 1:
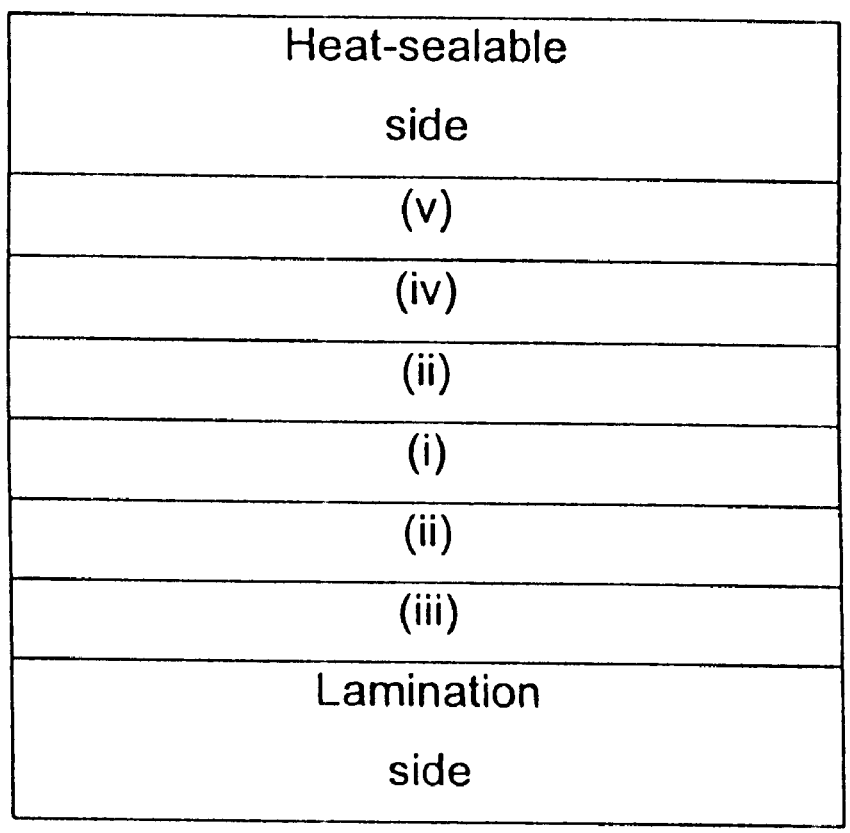
FIG. 1 is a diagrammatic representation of a multilayer film according to the present invention.

The sorbitan monoester is preferably a monoester of sorbitan and saturated and unsaturated fatty acids with between 8 and 40 carbon atoms. Examples of such fatty acids include palmitic acid, lauric acid, oleic acid, linoleic acid etc. Sorbitan monopalmitate and/or sorbitan monolaurate are particularly preferred.

The multilayer film of the present invention preferably contains no or only small amounts of substances, conventionally known as lubricants, for improving the surface slip properties of films. Typical lubricant substances are higher aliphatic acid amides, examples of which include, but are not limited to, erucamide or oleic acid amide, together with higher aliphatic acid esters, waxes, metallic soaps or polydimethylsiloxanes. A lubricant content of below 100 ppm is preferred, based on the total weight of the multilayer film. A lubricant-free form of the multilayer film is particularly preferred.

Layer (iv) of the multilayer film according to the present invention, typically contains substantially less sorbitan monoester at the time of film production than layer (v). At most, the layer (iv) contains 0.02 wt. % sorbitan monoester. In a particularly preferred embodiment of the present invention, layer (iv) does contains no sorbitan monoester at the time of film production. The sorbitan monoester may, however, immigrate from layer (v) into layer (iv) by, for example, diffusion processes, such that sorbitan monoester becomes detectable in layer (iv) after a period of time subsequent to the time of film production.

The layers (iii), (iv) and (v) of the multilayer film according to the present invention contain in addition to the ocasionally included sorbitan monoesters preferably polymers or mixtures of polymers selected from the group comprising polypropylene (PP), copolymers of ethylene and propylene (E/P), copolymers of ethylene and vinyl acetate (E/VA), particularly preferably with a vinyl acetate content, relative to the total weight of the polymer, of at most 20%, copolymers of ethylene and unsaturated esters such as butyl acrylate or ethyl acrylate (E/BA) or E/EA), copolymers of ethylene and unsaturated carboxylic acids (E/AA, E/MAA), particularly preferably with a content of carboxylic acid comonomer, relative to the total weight of the polymer, of at most 15%, still more preferably at most 8%, salts of the copolymers of ethylene and unsaturated carboxylic acids, in particular E/MM, (ionomers), particularly preferably with a carboxylic acid comonomer content, relative to the total weight of the ionomer, of at most 15%, still more preferably at most 10%, low density polyethylene (PE-LD), particularly preferably with a density of at least 0.91 g/cm$^3$ and at most 0.935 g/cm$^3$, high-density polyethylene (PE-HD), copolymers (PE-LLD) of ethylene and α-olefins with at least 3 C atoms, for example butene, hexene, octene, 4-methyl-1-pentene. The copolymers (PE-LLD) of ethylene and α-olefins may be produced using conventional catalysts or metallocene catalysts, as is known to the skilled artisan.

Layer (i) of the multilayer film of the present invention, preferably contains at least 50 wt. %, based on the total weight thereof, of an EVOH polymer having at least 40 and at most 85 mole % of vinyl acetate, which is at least 90% saponified.

Layers (ii) and (ii') of the multilayer film of the present invention, contain an extrudable coupling agent. Such coupling agents preferably comprise modified polyolefins such as for example polyethylene, polypropylene, ethylene/propylene copolymers, ethylenel/α-olefin copolymers or ethylene/vinyl acetate copolymers, which are grafted with at least one monomer from the group comprising α,β-monounsaturated dicarboxylic acids, such as for example maleic acid, fumaric acid, itaconic acid or the acid anhydrides thereof, acid esters, acid amides and acid imides. The extrudable coupling agents may also consist of copolymers of ethylene with α,β-monounsaturated dicarboxylic acids, such as acrylic acid, methacrylic acid and/or the metal salts thereof with zinc or sodium and/or the alkyl($C_1$–$C_4$) esters thereof, which may also be grafted with at least one monomer from the group comprising α,β-monounsaturated dicarboxylic acids, such as for example maleic acid, fumaric acid, itaconic acid or the acid anhydrides thereof, acid esters, acid amides and acid imides. In addition, polyolefins such as for example polyethylene, polypropylene, ethylene/propylene copolymers or ethylene/α-olefin copolymers, grafted with copolymers of ethylene with α,β-monounsaturated dicarboxylic acids, such as acrylic acid, methacrylic acid and/or the metal salts thereof with zinc or sodium and/or the alkyl($C_1$–$C_4$) esters thereof, may also be used. Particularly suitable coupling agents are polyolefins, in particular ethylene/α-olefin copolymers with grafted α,β-monounsaturated dicarboxylic anhydride, in particular maleic anhydride.

To achieve peelable heat sealing, in an embodiment of the multilayer film according to the present invention layer (v) and/or layer (iv) contain, in addition to the polymers already mentioned, a further thermoplastic raw material (A), which is immiscible with the polymers established in layer (v) and layer (iv). The thermoplastic raw material (A) is preferably polybutylene. Favorable concentrations of (A) are between 5 and 25 wt. %, based on the total weight of the layer in which (A) is contained.

All or some layers of the multilayer film according to the present invention may additionally be provided with additives which improve the functionality of the film. Examples of such additives include solid inorganic particles known as antiblocking agents, which stand out from the outer surface of the heat-sealable layer and thereby improve the surface slip behavior of the film. Silicon oxide, calcium carbonate, magnesium silicate, aluminum silicate, calcium phosphate, talc and the like are suitable for this purpose. Of these, silicon dioxide is preferably used. Effective amounts typically range from 0.05 to 2 wt. %, and preferably 0.1 to 0.8 wt. %. The average particle size is typically between 1 and 10 μm, preferably 2 and 5 μm, wherein spherical particles are particularly suitable. These particles are preferably used only in layer (v).

The multilayer film according to the invention may be colored by the addition of dyestuffs. Dyestuffs that may be used include those that are known to the skilled artisan.

The multilayer film according to the present invention is preferably pretreated on the lamination side to achieve increased surface tension, for example a pretreated by a corona treatment.

The multilayer film according to the invention exhibits a surprisingly rapid anti-fogging action after packaging of a moist product. Furthermore, it was not to have been expected that this action would last for a period of up to a week.

The high mechanical integrity of the multilayer film of the present invention, which does not allow separation of individual layers, is surprising. The multilayer film additionally exhibits unexpectedly good surface slip properties with regard to metal.

The present invention further provides a packaging material containing the multilayer film according to the present invention. The multilayer film according to the present invention together with the packaging material containing it may be produced using art-recognized multilayer composite production plants. The packaging material containing the multilayer film may comprise in particular a composite film with a substrate of paper, aluminum, cellulose film, polypropylene, polyalkylene terephthalate, polyamide, polycarbonate, polyvinyl alcohol, EVOH, polystyrene or combinations thereof, wherein the thermoplastics may be stretched or unstretched.

The supporting web and the multilayer laminating film according to the present invention are typically prefabricated separately and bonded together using a laminating adhesive to yield the packaging material according to the present invention.

The multilayer laminating film may be produced by coextrusion as a blown film or as a flat film.

The present invention is more particularly described in the following examples, which are intended to be illustrative only, since numerous modifications and variations therein will be apparent to those skilled in the art. Unless otherwise specified, all parts and percentages are by weight.

EXAMPLES

Comparative Example 1

A heat-sealable multilayer film with the structure PE-LD-3//HV//E/VOH//HV//PE-LD-1//PE-LD-2 with the layer thicknesses 15/3/5/3/7/7 μm was produced as a blown film by coextrusion and laminated to commercially available, biaxially stretched polypropylene of 20 μm thickness using a laminating adhesive.

PE-LD-1 exhibits a density of 0.923 g/cm$^3$, a melting point of 108° C. and contains 3.5% glycerol monostearate, PE-LD-2 exhibits a density of 0.923 g/cm$^3$, a melting point of 108° C. and is provided with 2000 ppm erucamide and 2000 ppm silicon oxide of the average particle size 5 μm. PE-LD-3 has a density of 0.923 g/cm$^3$, a melting point of 108° C. and contains no further additives. HV is a PE-LLD which is grafted with maleic anhydride and has a density of 0.92 g/cm$^3$. E/VOH is an ethylene/vinyl alcohol copolymer with an ethylene content of 38% and an MFR of 1.7 g/10 min.

Comparative Example 2

A heat-sealable multilayer film with the structure PE-LD-3//HV//E/VOH//HV//PE-LD-4//PE-LD-5 with the layer thicknesses 15/3/5/3/7/7 μm was produced as a blown film by coextrusion and laminated to commercially available, biaxially stretched polypropylene of 20 μm thickness using a laminating adhesive.

PE-LD-3, E/VOH and HV correspond to the compositions given under Comparative Example 1, PE-LD-4 exhibits a density of 0.923 g/cm³, a melting point of 108° C. and contains 3.5% sorbitan monolaurate, PE-LD-5 exhibits a density of 0.923 g/cm³, a melting point of 108° C. and is provided with 1000 ppm silicon oxide of the average particle size 8 μm.

Example 3

A heat-sealable multilayer film according to the present invention with the structure PE-LD-3//HV//E/VOH//HV//PE-LD-3//PE-LD-6 with the layer thicknesses 15/3/5/3/7/7 μm was produced as a blown film by coextrusion and laminated to commercially available, biaxially stretched polypropylene of 20 μm thickness using a laminating adhesive.

PE-LD-3, E/VOH and HV correspond to the compositions given under Comparative Examples 1 and 2, PE-LD-6 exhibits a density of 0.923 g/cm³, a melting point of 108° C. and contains 3.0% sorbitan monolaurate together with 1000 ppm silicon oxide of the average particle size 8 μm.

Comparative Example 4

A heat-sealable multilayer film with the structure PE-LD-3//HV//E/VOH//HV//PE-LD-3//PE-LD-7 with the layer thicknesses 15/3/5/3/7/7 μm was produced as a blown film by coextrusion and laminated to commercially available, biaxially stretched polypropylene of 20 μm thickness using a laminating adhesive.

PE-LD-3, E/VOH and HV correspond to the compositions given under Example 3, PE-LD-7 exhibits a density of 0.923 g/cm³, a melting point of 108° C. and contains 1.5% sorbitan monolaurate together with 1000 ppm silicon oxide of the average particle size 8 μm.

The multilayer film described as in Example 3 together with the Comparative Examples were measured in relation to the following properties.

Interlayer adhesion measured in accordance with DIN 53,357, method B.

Antifogging action, measured using ICI's "Cold Fog Test" method. The method is described in ICI publication 90-6E "Antifog evaluation tests for agricultural and food-packaging film" (editor Nora van der Avort, ICI Europe Ltd., publishers White & Farrell Ltd., England 1993). Evaluations of the appearance of a multilayer film stretched over a water-filled beaker stored at 40° C. were performed over time, and the ratings assigned thereto are summarized in the following table.

| Rating | Description | Performance |
| --- | --- | --- |
| A | Opaque layer of small fog droplets | Very poor |
| B | Opaque or transparent layer of large droplets | Poor |
| C | Complete layer of large transparent droplets | Poor |
| D | Randomly distributed or large transparent droplets | Good |
| E | Transparent film without visible water | Excellent |

The coefficient of sliding friction of the heat-sealable side with regard to metal was determined in accordance with DIN 53,375.

The results of the evaluation of the multilayer films of the Examples are summarized in Table 1.

TABLE 1

| Feature | Unit | Comparative Example 1 | Comparative Example 2 | Example 3 | Comparative Example 4 |
| --- | --- | --- | --- | --- | --- |
| Coefficient of sliding friction | 1 | 0.9 | 0.7 | 0.4 | 0.4 |
| Interlayer adhesion | N/15 mm | 4.3 | 4.5 | inseparable | |
| Cold Fog rating | | | | | |
| after 30 minutes | rating | C/D | C/B | A | A |
| after 2 hours | rating | C/D | C/D | B | B |
| after 5 hours | rating | C/B | C/D | B | B |
| after 1 day | rating | C/B | C/D | B | B |
| after 2 days | rating | C/B | C/D | E | C/D |
| after 4 days | rating | C/B | C/D | E | C/D |
| after 7 days | rating | C/D | C/D | E | E |

Although the invention has been described in detail in the foregoing for the purpose of illustration, it is to be understood that such detail is solely for that purpose, and that variations can be made therein by those skilled in the art without departing from the spirit and scope of the invention except as it may be limited by the following claims.

What is claimed is:

1. A multilayer film having a lamination side and a heat-sealable side comprising:
    a) an inner layer (i) of ethylene/vinyl alcohol copolymer;
    b) a coupling agent layer (ii) and a separate coupling agent layer (ii'), said inner layer (i) being interposed between and in contact with each of said coupling agent layer (ii) and said separate coupling agent layer (ii');
    c) at least one further layer (iii), said separate coupling agent layer (ii') being interposed between and in contact with each of said inner layer (i) and said layer (iii);
    d) at least one layer (iv), said coupling agent layer (ii) being interposed between and in contact with each of said inner layer (i) and said layer (iv); and
    e) a heat-sealable layer (v), said layer (iv) being interposed between and in contact with each of said coupling agent layer (ii) and said heat-sealable layer (v);
    wherein said multilayer film contains sorbitan monoester in an amount totaling from 0.1 to 3 wt. %, based on the total weight of said multilayer film, said layer (iii) defining said lamination side of said multilayer film, and said heat-sealable layer (v) defining said heat-sealable side of said multilayer film.

2. The multilayer film of claim 1, wherein said layer (iv) contains less than 0.02 wt. % sorbitan monoester, relative to the total weight of the film, at the time of film production.

3. The multilayer film of claim 1, wherein said coupling agent layer (ii) and said separate coupling agent layer (ii')

each independently contain a member selected from the group consisting of a polyolefin homo- or copolymer, an ethylene/α-olefin copolymer, a ethylene/vinyl acetate copolymer grafted with an α,β-monounsaturated dicarboxylic anhydride and mixtures thereof.

4. The multilayer film of claim 1, wherein said layers (iii), (iv) and (v) each independently contain a member selected from the group consisting of polypropylene (PP), copolymers of ethylene and propylene (E/P), copolymers of ethylene and vinyl acetates (E/VA), copolymers of ethylene and unsaturated carboxylic acids (E/M), copolymers of ethylene and unsaturated carboxylic acid monomers (E/MAA), polyethylene (PE), copolymers of ethylene and α-olefins (PE-LLD) and mixtures thereof.

5. The multilayer film of claim 1, wherein said multilayer film contains 0.3% to 1% sorbitan monoester, based on the total weight of said multilayer film.

6. The multilayer film of claim 1, wherein said sorbitan monoester is a monoester of sorbitan and saturated or unsaturated fatty acids having between 8 and 40 carbon atoms.

7. The multilayer film of claim 6, wherein said sorbitan monoester is selected from sorbitan monopalmitate, sorbitan monolaurate and mixtures thereof.

8. A packaging material comprising a multilayer film on a supporting substrate, the multilayer film having a lamination side, a heat sealable side and comprising:

a) an inner layer (i) of ethylene/vinyl alcohol copolymer;

b) a coupling agent layer (ii) and a separate coupling agent layer (ii'), said inner layer (i) being interposed between and in contact with each of said coupling layer (ii) and said separate coupling layer (ii');

c) at least one further layer (iii), said separate coupling agent layer (ii') being interposed between and in contact with each of said inner layer (i) and said layer (iii);

d) at least one layer (iv), said coupling agent layer (ii) being interposed between and in contact with each of said inner layer (i) and said layer (iv); and e) a heat-sealable layer (v), said layer (iv) being interposed between and in contact with each of said coupling agent layer (ii) and said heat-sealable layer (v);

wherein said multilayer film contains sorbitan monoester in an amount totaling from 0.1 to 3 wt. %, based on the total weight of said multilayer film, said layer (iii) defining said lamination side of said multilayer film, and said heat-sealable layer (v) defining said heat-sealable side of said multilayer film.

9. A method of packaging foodstuffs, which comprises packaging said foodstuffs in the multilayer film of claim 1 or in a film comprising the multilayer film of claim 1.

* * * * *

UNITED STATES PATENT AND TRADEMARK OFFICE
CERTIFICATE OF CORRECTION

PATENT NO. : 6,576,348 B2
DATED : June 10, 2003
INVENTOR(S) : Eggers et al.

It is certified that error appears in the above-identified patent and that said Letters Patent is hereby corrected as shown below:

Column 9,
Line 11, "carboxylic acids (E/M)" should read -- carboxylic acids (E/A) --

Signed and Sealed this

Eighth Day of February, 2005

JON W. DUDAS
*Director of the United States Patent and Trademark Office*